(12) United States Patent  (10) Patent No.: US 7,615,719 B2
Shipulski  (45) Date of Patent: Nov. 10, 2009

(54) AUTONOMOUS PLASMA CUTTING SYSTEM

(75) Inventor: E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 11/518,858

(22) Filed: Sep. 11, 2006

(65) Prior Publication Data

US 2008/0083709 A1 Apr. 10, 2008

(51) Int. Cl.
B23K 10/00 (2006.01)
(52) U.S. Cl. .............. 219/121.5; 219/121.39; 219/121.45; 219/121.48; 219/130.1
(58) Field of Classification Search ............ 219/121.39, 219/121.45, 121.48, 121.54, 121.55, 130.1, 219/132, 133, 137.9
See application file for complete search history.

(56) References Cited

U.S. PATENT DOCUMENTS

| 3,309,497 | A | 3/1967 | Kensrue |
| 4,182,949 | A | 1/1980 | Powers et al. |
| 4,525,621 | A | 6/1985 | Puschner ............... 219/137 PS |
| 5,086,205 | A | 2/1992 | Thommes |
| 5,250,786 | A | 10/1993 | Kikuchi et al. ......... 219/130.32 |
| 6,051,809 | A | 4/2000 | Colella |
| 6,111,215 | A | 8/2000 | Lilly |
| 6,194,682 | B1 | 2/2001 | Schneider et al. ...... 219/121.55 |
| 6,225,596 | B1 | 5/2001 | Chandler et al. |
| 6,331,694 | B1 | 12/2001 | Blankenship .......... 219/137 PS |
| 6,406,759 | B1 | 6/2002 | Roth |
| 6,444,944 | B2 | 9/2002 | Schneider et al. |
| 6,476,354 | B1 | 11/2002 | Jank et al. ............... 219/137 PS |
| 6,479,795 | B1 | 11/2002 | Albrecht et al. .......... 219/137.2 |
| 6,512,201 | B2 | 1/2003 | Blankenship |
| 6,552,303 | B1 | 4/2003 | Blankenship et al. .... 219/130.5 |
| 6,747,246 | B2 | 6/2004 | Crandell, III ............ 219/130.1 |
| 6,777,649 | B2 | 8/2004 | Reynolds et al. |
| 6,818,860 | B1 | 11/2004 | Stava et al. |
| 6,977,358 | B2 | 12/2005 | Albrecht et al. .......... 219/130.1 |
| 6,982,398 | B2 | 1/2006 | Albrecht ..................... 219/133 |
| 7,183,517 | B2 | 2/2007 | Albrecht et al. .......... 219/130.4 |
| 7,188,645 | B2 | 3/2007 | Bender et al. |
| 2001/0042736 | A1 | 11/2001 | Schneider et al. ...... 219/121.55 |

(Continued)

FOREIGN PATENT DOCUMENTS

CA 1 090 428 11/1980

(Continued)

OTHER PUBLICATIONS

International Search Report for International Application No. PCT/US2007/078044, Date of Mailing Dec. 3, 2007, including Written Option of the International Searching Authority (13 pages total).

Primary Examiner—Mark H Paschall
(74) Attorney, Agent, or Firm—Proskauer Rose LLP

(57) ABSTRACT

A portable plasma arc torch system can be used for processing materials. The system includes a replaceable or rechargeable power source and replaceable or rechargeable gas source. A controller communicates with at least one of the power source or the gas source. A plasma delivery device received via the controller current from the power source and gas from the gas source to generate a plasma arc at an output of the plasma delivery device. The plasma arc can be used to process materials such as metallic workpieces.

20 Claims, 9 Drawing Sheets

U.S. PATENT DOCUMENTS

| | | |
|---|---|---|
| 2002/0023908 A1 | 2/2002 | Blankenship ............ 219/130.1 |
| 2002/0187066 A1 | 12/2002 | Yu et al. |
| 2004/0069752 A1* | 4/2004 | Ulrich et al. ........... 219/121.39 |
| 2005/0109748 A1 | 5/2005 | Albrecht et al. .......... 219/130.1 |
| 2005/0252889 A1 | 11/2005 | Stanzel et al. ................. 219/74 |
| 2005/0252890 A1 | 11/2005 | Stanzel et al. ................. 219/74 |
| 2005/0252899 A1 | 11/2005 | Stanzel et al. ............ 219/137.2 |
| 2006/0124638 A1* | 6/2006 | Jensen ........................ 219/765 |
| 2006/0138113 A1* | 6/2006 | Ott ............................. 219/132 |
| 2007/0181547 A1 | 8/2007 | Vogel et al. .............. 219/130.1 |
| 2007/0187376 A1* | 8/2007 | Albrecht et al. .......... 219/130.1 |
| 2007/0221628 A1 | 9/2007 | Stanzel et al. |
| 2007/0257084 A1 | 11/2007 | Carrier et al. |

FOREIGN PATENT DOCUMENTS

| | | |
|---|---|---|
| DK | 83 08 999.3 | 11/1983 |
| EP | 1 500 456 | 1/2005 |
| EP | 1 535 691 A2 | 6/2005 |
| EP | 1 629 926 A2 | 3/2006 |
| EP | 1 852 206 | 11/2007 |
| GB | 2 316 244 A | 2/1998 |
| JP | 356077068 A | 6/1981 |
| JP | 401245972 A * | 10/1989 |

* cited by examiner

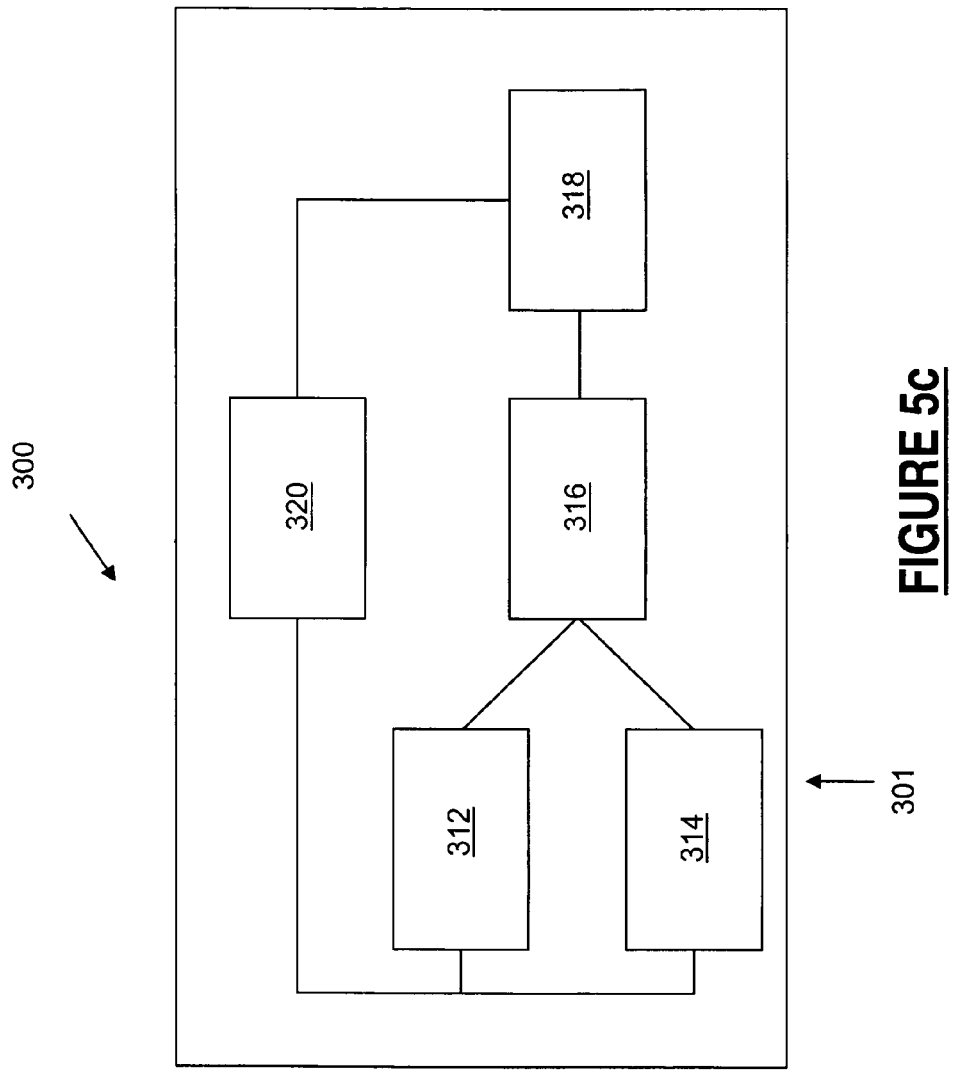

AUTONOMOUS PLASMA CUTTING SYSTEM

TECHNICAL FIELD

The technology relates generally to portable tools for processing materials. In particular, the technology relates to portable, held-held plasma arc torch systems for processing materials.

BACKGROUND

Plasma arc torch systems can be applied to a wide variety of material processing applications such as cutting the thin plates of metal used for heating, ventilation and air conditioning systems or thick plates of steel. Traditionally, plasma arc torch systems are not portable because they require a large, cumbersome gas source (or a continuous, fixed gas source) and large amounts of power drawn from the electrical power grid via a corded attachment.

Despite cordless power tools being pervasive in the commercial market, plasma arc torch systems have yet to be efficiently adapted for easy, portable usage. One design difficulty is caused by the relatively large gas consumption of a plasma arc torch. Another design difficulty is caused by the high power requirements of the plasma arc torch system, e.g., about 1.32 kW output for a low power system such as the Powermax™ 190C manufactured by Hypertherm, Inc. of Hanover, NH; 8.4 kW output for a medium power torch system such as the Powermax 1000 manufactured by Hypertherm, Inc.; and up to 16,000 kW output for a high power torch system such as the Powermax 1650 manufactured by Hypertherm, Inc. There exists a difficult balance between the performance of the torch, the lifetime of the gas source and the power source, and actual physical size of the plasma arc torch system.

It is therefore desirable to provide a portable plasma arc torch system that has power considerations for operating the torch effectively at lower gas consumption and lower power levels, while providing portability and performance for the applications described above. Additionally, it is desirable for the gas source and the power source of the plasma arc torch system to operate for a commercially useful duration with ease of recharge or replacement for repeatable use.

SUMMARY OF THE TECHNOLOGY

The technology represents an advance in the plasma processing industry in that embodiments of the technology are portable systems that can process materials without the need for a large, cumbersome gas source (or, in some embodiments, a continuous, fixed gas source) and without being continuously connected to the electrical power grid. As such, embodiments of the technology can be used at construction sites, in agricultural areas, by emergency safety personnel (e.g., firefighters, police, etc.), by workers in remote locations where connectivity to the electrical power grid is not possible, or by consumers in their own backyards.

In one aspect, the technology features a portable plasma arc torch system that can be used for processing materials (e.g., cutting, piercing, marking or scoring metallic workpieces). In some embodiments, the system includes a replaceable or rechargeable power source, such as one or more batteries. The system also includes a replaceable or rechargeable gas source disposed relative to the power source. The gas source can be disposable or refillable (e.g., one or more gas containers). In some embodiments, the gas source can be a continuous source of gas (e.g., a compressor). In some embodiments, the power source and the gas source are stored in a portable enclosure.

In some embodiments, a controller communicates with at least one of the power source or the gas source. The controller can include electrical controls and fluid controls. A plasma delivery device (e.g., a plasma arc torch) uses current and voltage from the power source and gas from the gas source to generate a plasma arc at an output of the plasma delivery device. The plasma arc can be used to process materials such as metallic workpieces.

The controller is electrically connected to the power source, the gas source and a plasma delivery device by a communication path (e.g., a bus, a wireless connection, etc.). In some embodiments, a transmission medium provides electrical and a fluid communication paths the power source and the plasma delivery device and the gas source and the plasma delivery device, respectively. The power source is in electrical communication with the plasma delivery device via an electrical communication path (e.g., an electrical lead set, a wireless connection, etc.). The gas source is in fluid communication with the plasma delivery device via a fluid conduit. In some embodiments, the electrical lead set, the fluid conduit and the plasma delivery device can be storable in the portable enclosure. In addition, the enclosure is transportable and can be a hand-held housing and/or a briefcase-sized housing.

In another aspect, the technology also features a portable plasma arc torch system that can be used for cutting a workpiece. The system can include a portable enclosure with a replaceable or rechargeable power means and a replaceable or rechargeable gas means disposed within the enclosure. A control means and a transmission means are in communication the power means and the gas means. A plasma delivery means receives current and voltage from the power means and gas from the gas means to generate a plasma arc that can be used for cutting a workpiece.

The control means can be in electrical communication with the power means, the gas means and the plasma delivery means. The transmission means provides electrical and fluid communication paths from the power means and gas means to the plasma delivery means. The power means is in electrical communication with the plasma delivery means via an electrical communication path (e.g., an electrical lead set, a wireless connection, etc.). The gas means is in fluid communication with the plasma delivery means via a fluid conduit. In some embodiments, the electrical lead set, the fluid conduit and the plasma delivery means can be storable in the portable enclosure. The enclosure is transportable and can be a hand-held housing and/or a briefcase-sized housing.

BRIEF DESCRIPTION OF THE DRAWINGS

The foregoing and the technology will be more fully understood from the following description of various embodiments, when read together with the accompanying figures.

FIG. 5c is a variation of FIG. 5a with all components of the system housed in a single partition.

DETAILED DESCRIPTION

Plasma arc torches have a wide variety of applications such as the cutting of thick plates of steel and the cutting of comparatively thin sheets of galvanized metal commonly used in heating, ventilating and air conditioning (HVAC) systems. The basic components of a plasma arc torch include a torch body, an electrode (cathode) mounted within the body, a nozzle (anode) with a central exit orifice, a gas source to provide a flow of an ionizable gas, electrical connections, passages for cooling and arc control fluids, and a power source that produces a pilot arc in the gas, typically between the electrode and the nozzle, and then a plasma arc, a conductive flow of the ionized gas from the electrode to a workpiece. The gas can be non-oxidizing, e.g. nitrogen, argon/hydrogen, or argon, or oxidizing, e.g. oxygen or air.

Various plasma arc torches of this general type are described in U.S. Pat. Nos. 4,791,268; 4,902,871; 5,170,033; 5,317,126; 5,994,663, all commonly assigned with the present application. Plasma arc torches and related products are sold in a variety of models by a number of manufacturers including Hypertherm, Inc. The Powermax 1000 brand torch sold by Hypertherm is typical of the medium power torches, using H35 (35% H 65% Ar) and N2 or H35 and air as the working gas and useful for both plate fabrication and HVAC applications. The Powermax 1650 brand torch sold by Hypertherm is typical of the high power torches often using H35 and N2 as the working gas. High power torches can be water-cooled and used to pierce and cut thick metal sheets, e.g. 1 inch thick mild steel plate.

Figure 1:
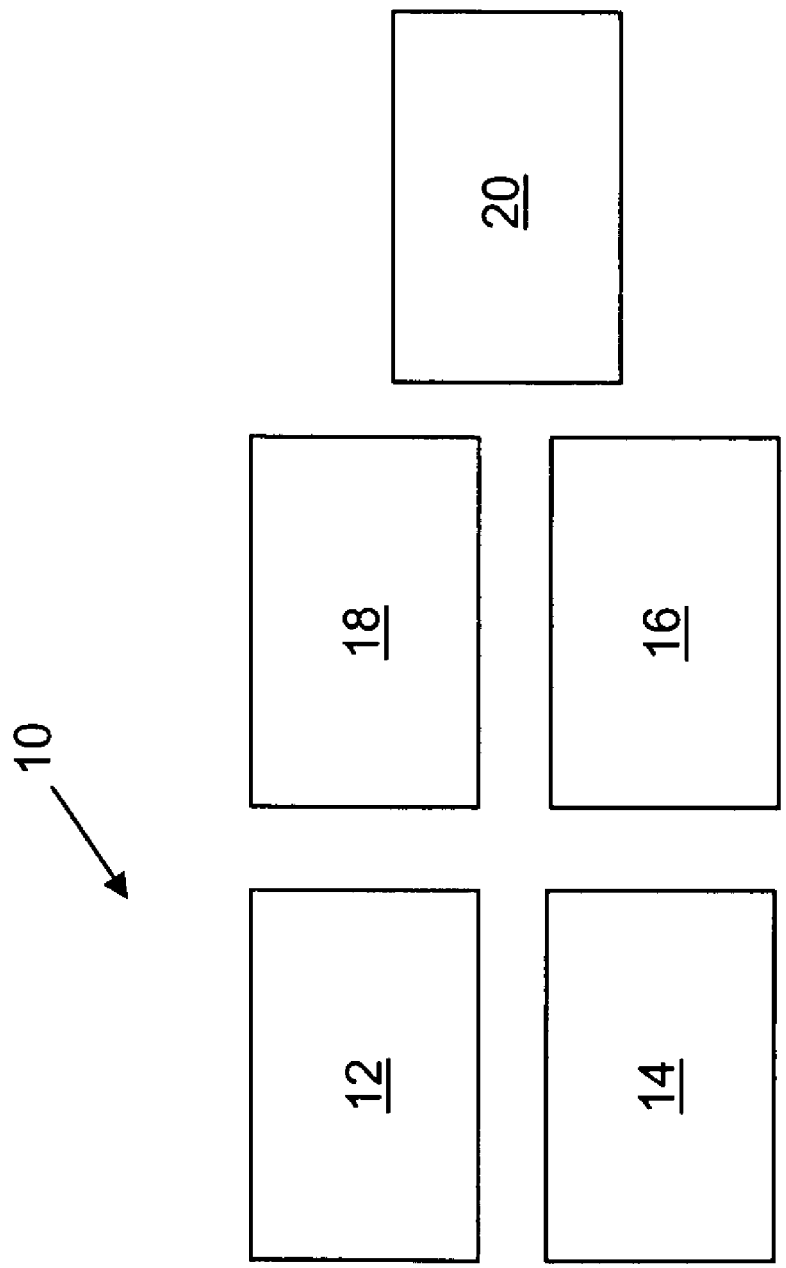
FIG. 1 is a block diagram showing the representative functional components of an autonomous plasma arc torch system.

Referring now to FIG. 1, a block diagram showing representative functional components of a plasma arc torch system 10 is shown. This plasma arc torch system is "autonomous" in that it is a portable system capable of processing metallic materials without large, bulky gas canisters (and, in some embodiments, without a continuous, fixed gas source) and without connection to the electrical power grid by a power cord. In various embodiments, the system is mobile and transportable. In some embodiments, the system can be disposed in a "briefcase-sized" (and/or hand-held) housing that can be hand-carried or otherwise transported to local and remote locations for use. In other embodiments, the system may be more compact, including a plasma delivery device that can be charged and removed from a power source disposed in a briefcase-sized housing for remote use (e.g., a system comparable in size to that of a cordless drill). It is expected that embodiments of the technology can be used at construction sites, in agricultural areas, by emergency safety personnel (e.g., firefighters, police, etc.), by workers in remote locations where connectivity to the electrical power grid is not possible or desirable, or by consumers in their own backyards.

In one exemplary embodiment, the system 10 includes five primary components: a power source 12, a gas source 14, a transmission medium 16, a controller 18 and a plasma delivery device 20. The power source 12 can be rechargeable and/or replaceable (e.g., one or more batteries). The gas source 14 can be one or more replaceable and/or rechargeable gas containers or a portable compressor. The transmission medium 16, which can include an electrical transmission capability and/or a fluid transmission capability, is connected to the plasma delivery device 20. The electrical transmission capability can include an electrical lead set, such as any of those manufactured by Hypertherm Inc., a bus or a wireless connection. The fluid transmission capability can include a fluid conduit. The controller 18 can include electrical controls and/or a fluid controls (e.g., a trigger, relay, solenoid valve, pressure regulator, etc.). The plasma delivery device 18 can include a plasma arc torch, such as those manufactured by Hypertherm, Inc. The torch can be started by manipulating a trigger (not shown) disposed on the device 18. In addition, the system 10 can include various user controls (not shown), such as a current limiting switch, a toggle switch, a key pad, a touch pad, dials, knobs or other means to enable a user to manipulate or otherwise control parameters of the torch.

Figure 2:
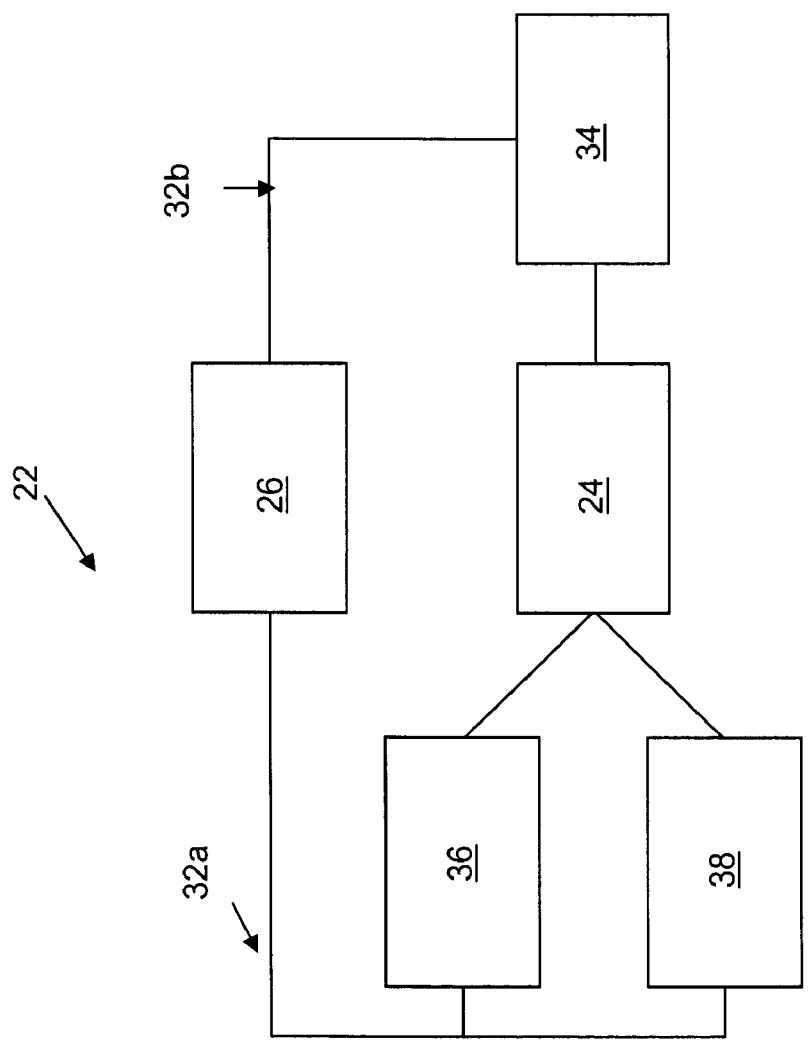
FIG. 2 is a block diagram showing an implementation of the representative components of an autonomous plasma arc torch system using a single control means and a single transmission medium.

FIG. 2 is a block diagram showing one exemplary implementation of the representative components of an autonomous plasma arc torch system 22 using a single transmission medium 24 and a single controller 26. The controller 26 communicates with the power source 28 and the gas source 30 via a common electrical connection 32 (e.g., a bus). In addition, the controller uses another electrical connection 32b to communicate with the plasma delivery device 34. The power source 36 provides current and the gas source 38 provides gas to the plasma delivery device 34 via the transmission medium 24. In one implementation, the transmission medium 24 comprises an electrical lead set for providing current from the power source 36 to the plasma delivery device 34, and a fluid conduit for providing gas from the gas source 38 to the plasma delivery device 34. The plasma delivery device 34 can be a plasma arc torch. The system 22 can also include user controls, as described previously, to control parameters of the torch.

Figure 3:
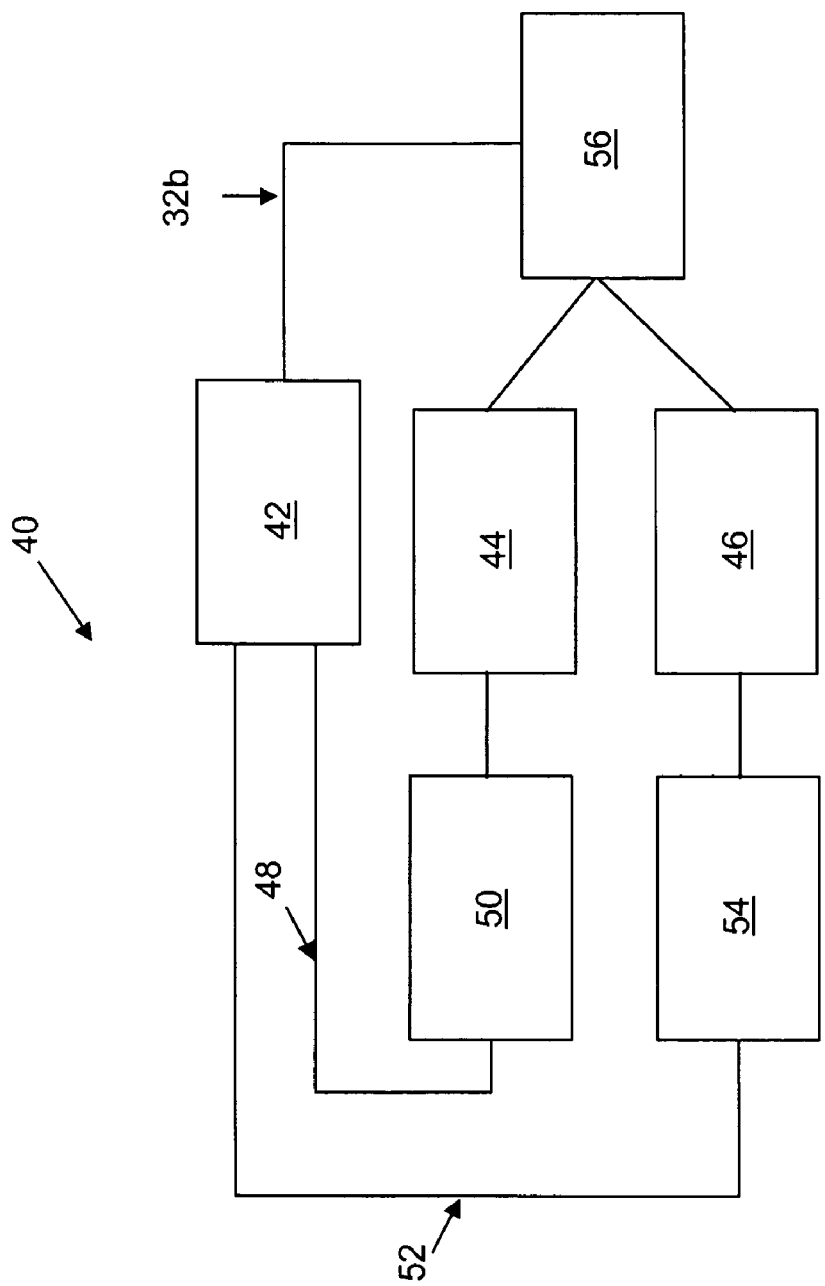
FIG. 3 is a block diagram showing a variation of the implementation of FIG. 2 using a single controller and a pair of transmission medium.

FIG. 3 is a block diagram showing another implementation of a portable plasma arc torch system 40. The system 40 uses a single controller 42 and a pair of transmission media 44, 46. The controller 42 communicates via a first electrical connection 48 with the power source 50 and communicates via another electrical connection 52 with the gas source 54. The controller 42 also communicates with the plasma delivery device 56. The power source 50 provides current to the plasma delivery device 56 via a transmission medium 44, and the gas source 54 provides gas to the plasma delivery device 56 via the transmission medium 46. The plasma delivery device 56 can be a plasma arc torch. The system 40 can also include user controls (not shown) to control parameters of the torch.

Figure 4:
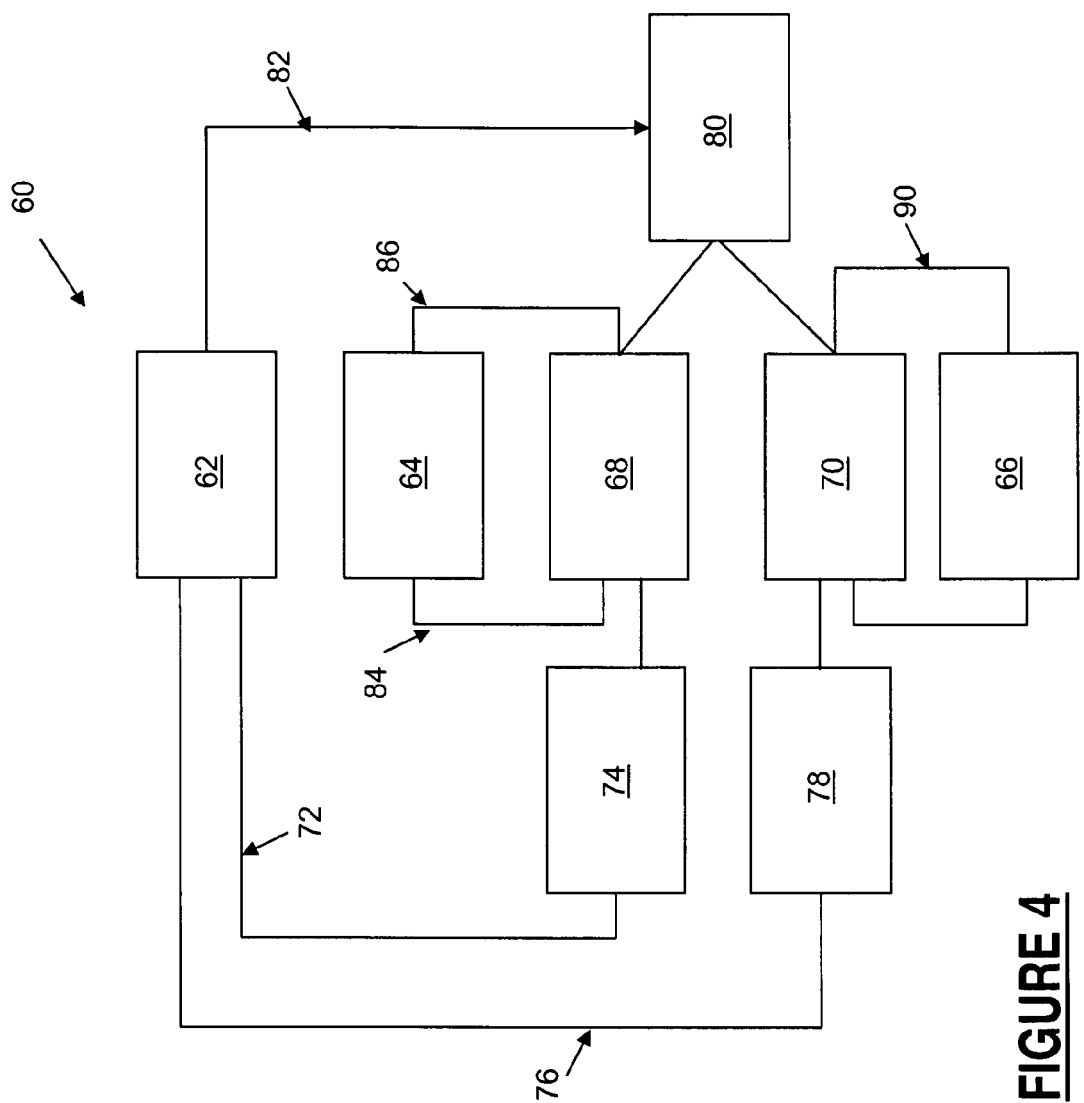
FIG. 4 is a block diagram showing a variation of the implementation of FIG. 2 using three controllers and two transmission medium.

FIG. 4, a block diagram showing a variation of the implementation of a portable plasma arc torch system 60 using three controllers 62, 64, 66 and two transmission media 68 70. The controller 62 communicates via an electrical connection 72 with the power source 74 and via a separate electrical connection 76 with the gas source 78. The controller 62 communicates with the plasma delivery device 80 via another electrical connection 82. The controller 64 communicates with the transmission medium 68 via two electrical connections 84, 86. Similarly, the controller 66 communicates with the transmission medium 70 via two electrical connections 88, 90. The power means 74 provides current to the plasma delivery device 80 by way of transmission medium 68, and the gas source 78 provides gas to the plasma delivery device 80 by way of a transmission medium 70. The plasma delivery device 80, which can be a plasma arc torch, is positioned relative to a workpiece for cutting operations. The system 60 can also include user controls, as described previously.

FIGS. 5a, 5b, 5c and 5d are exemplary embodiments of various physical partitioning configurations of the autonomous plasma cutting system.

Figure 5A:
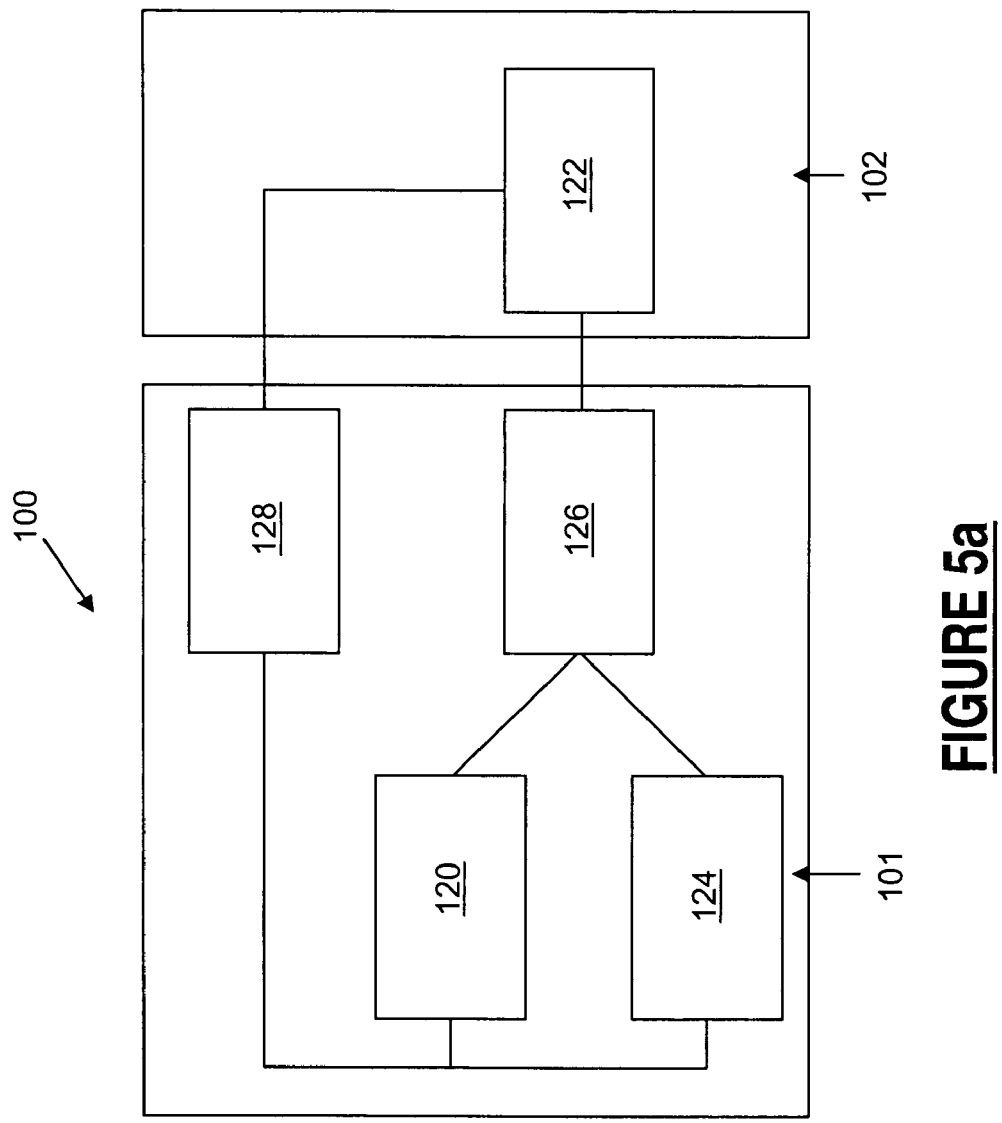
FIG. 5a is an example of a physical partitioning of the functional implementation with the plasma delivery device in one partition and connected to the power means, controller and transmission medium housed in another partition.

FIG. 5a depicts a plasma torch system 100 partitioned into an enclosure section 101 and a torch section 102. In one embodiment, the two sections are stored in a single, briefcase-style housing (not shown). The housing can be hand-held to enable a user to carry the system 100 to a remote location. The enclosure section 101 includes a power source 120, gas source 124, transmission medium 126, and controller 128. The plasma delivery device 122 is located in the torch section 102.

Figure 5B:
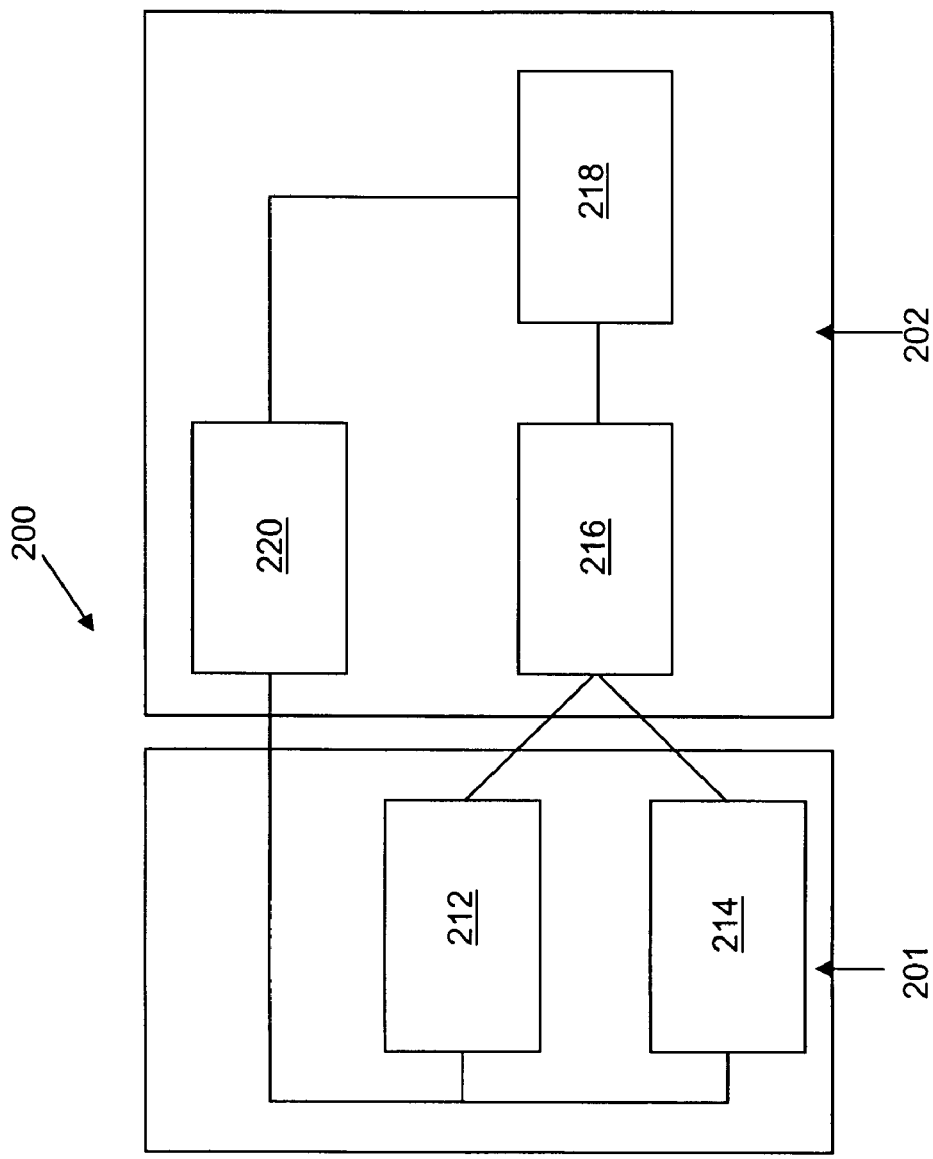
FIG. 5b is a variation of FIG. 5a with the plasma delivery, controller and transmission medium housed in one partition and connected to the power means and gas means housed in another partition.

FIG. 5b depicts a plasma torch system 200 partitioned into a torch attachment section 201 and a torch section 202. In one embodiment, the two sections are stored in a single, briefcase-style housing. The attachment section 201 can be thought of as analogous to a removable battery pack, except that it includes both a power source 212 and gas source 214. The torch section 202 includes a transmission medium 216, controller 220 and a plasma delivery device 218.

FIG. 5c depicts a plasma torch system 300 having the primary components in a single enclosure 301 (or housing). The enclosure section 301 includes a power source 312, gas source 314, transmission medium 316, controller 320, and plasma delivery device 318.

Figure 5D:
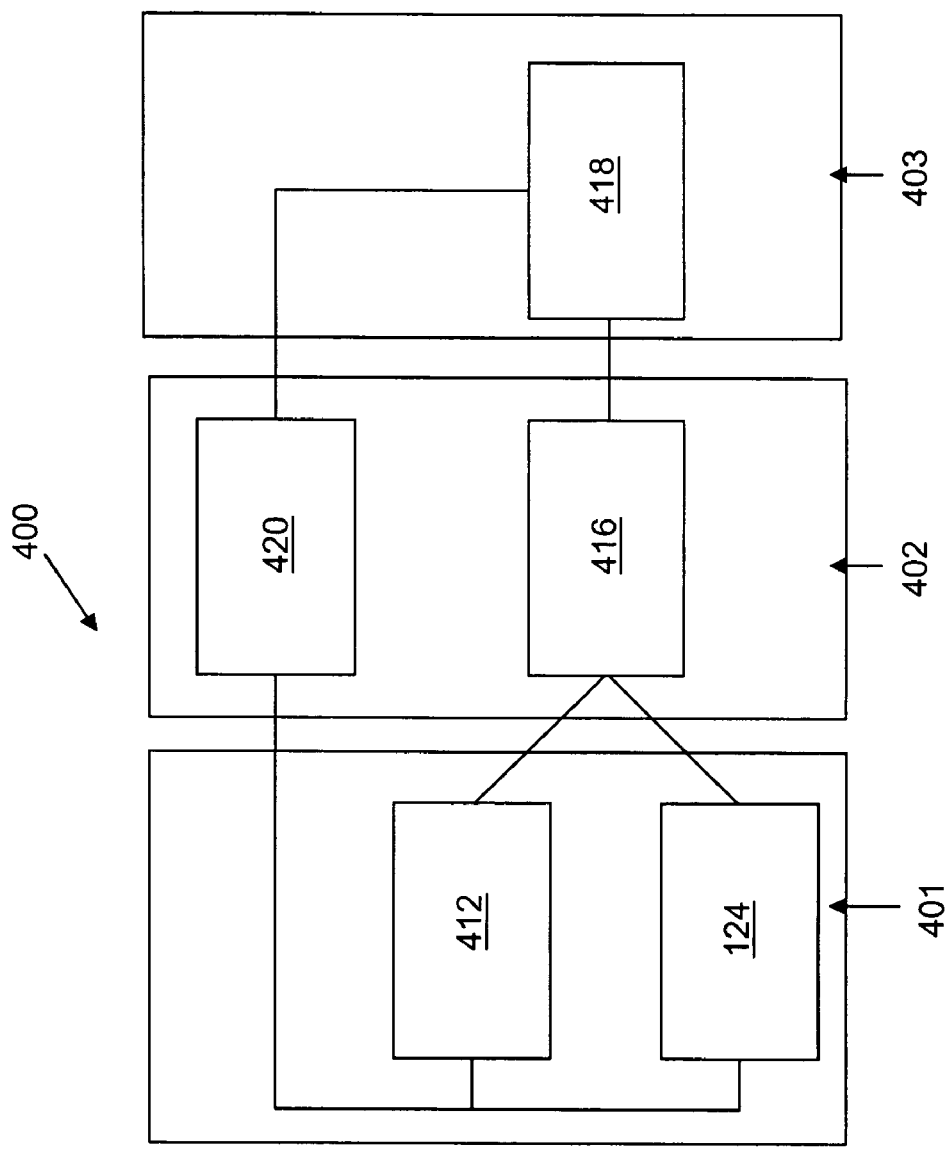
FIG. 5d is a variation of FIG. 5a with the plasma delivery device in one partition and connected to the control and transmission medium in a second partition, and connected to the power means and gas means, housed in a third partition.

FIG. 5d depicts a plasma torch system 400 that can be partitioned into an enclosure attachment section 401, an enclosure section 402 and a torch section 403. The enclosure section 402 includes a transmission medium 416 and a controller 418. The plasma delivery device 418 is located in the torch section 403. In one embodiment, the three sections are stored in a single, briefcase-style housing capable of being hand-carried by a user.

Figure 6:
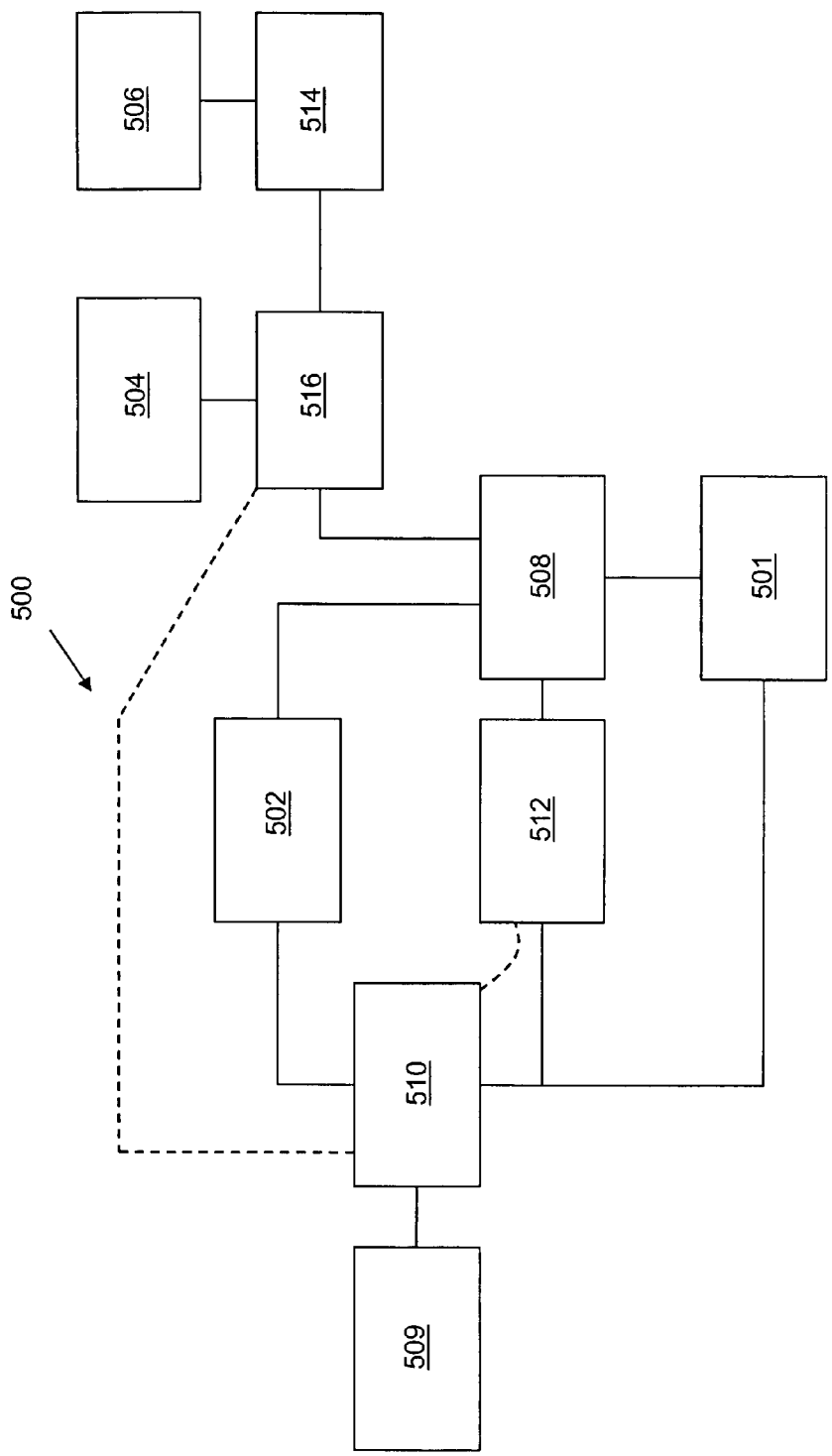
FIG. 6 is a detailed block diagram of an exemplary autonomous plasma arc torch system.

FIG. 6 is a detailed block diagram of an autonomous plasma arc torch system 500 capable of cutting a workpiece 501. The power system includes a pair of a rechargeable and/or replaceable power sources 502 and 504. In one detailed embodiment, the power source 502 is an acid lead battery with 12V, 1.3. Amps Hrs, maximum discharge current of 19.5 Amps, e.g. manufactured by IMC Power. The gas source 506 can be replaceable and/or rechargeable gas bottle. In one embodiment, the gas source 506 is a carbon fiber wrapped bottle with a 3,000 PSI capacity, e.g. manufactured by Pure Energy. An electrical lead set (not shown) provides a communication path between the power sources 502, 504 and the torch 508, and a fluid conduit (not shown) provides a fluid flow path between the gas source 506 and the torch 508.

The system includes a plasma arc torch 508, e.g., the PAC 105 hand torch manufactured by Hypertherm, Inc. The torch 508 can be turned on and off by manipulating the trigger 509. During operation, the torch 508 receives current and voltage from the power source 502 via a solid state relay 510. In one detailed embodiment, the relay 510 is a DC solid-state relay with output to 100A, 200 VDC, e.g. manufactured by Teledyne Relay. A pilot arc circuit 512, powered by the power source 502, is provided to generate a pilot arc within the torch 508. The circuit 512 can be a custom-design or any one of a variety of pilot arc circuits known in the art of plasma torch technology.

The gas source 506 provides a supply of gas to the torch 508 via a pressure regulator 514 and a solenoid valve 516. In one detailed embodiment, a pressure reducing regulator is employed having 3,000 PSI input, 2-80 PSI output and 100 PSI max (e.g., manufactured by Premier Industries), and a two-way solenoid valve is used with a 24 VDC coil input, 6 Watts nominal operation range and a valve flow coefficient (Cv) of 0.155 (e.g., manufactured by GEMS Sensors and Controls).

To operate the system 500, the regulator 514 is adjusted to preset the pressure of the gas to be supplied to the torch 508 (e.g., to 60 psig). With the torch 508 being remotely located relative to the workpiece 501, a user pulls the trigger 509 to close the relay 510 and to activate the pilot arc circuit 512. The solenoid valve 516 is energized by the power source 504. The gas flow is established, and a pilot arc is initiated using the pilot arc circuit. At this point, the torch can be moved closer to the workpiece 501.

More specifically, with the relay 510 closed, the power source 504 supplies current and voltage to the pilot arc circuit 512, causing a pilot arc to form between the electrode and nozzle in the torch 508. Initiation of the gas flow via the valve 516 causes separation of the electrode and the nozzle, initiating an arc and igniting a plasma. With the plasma gas exiting the torch, the torch 508 is positioned in close proximity to the workpiece 501. The pilot arc and gas flow facilitate the formation of an electrical path between the workpiece 501 and the electrode. Eventually, a second arc forms between the electrode and workpiece. The pilot arc circuit 512 can be configured to provide a decreasing pilot arc current, so that the second arc remains as the pilot arc current goes to zero and pilot arc itself extinguishes. In one example, the torch 508 is capable of generating a transferred arc for about 30 seconds at 30 amps and 100 volts.

While the technology has been particularly shown and described with reference to specific embodiments, it should be understood by those skilled in the art that various changes in form and detail may be made therein without departing from the spirit and scope of the above description.

The invention claimed is:

1. An autonomous plasma arc torch apparatus for processing materials comprising:
    a replaceable or rechargeable battery;
    a replaceable or rechargeable portable gas container configured such that the plasma arc torch is capable of processing materials without a continuous gas source;
    a controller in communication with the battery and the portable gas container;
    a plasma delivery device receiving, via the controller, a DC current from the battery and gas from the portable gas container to generate a plasma arc; and
    a mobile, portable enclosure capable of being hand-carried to a remote location, the portable enclosure housing the battery, the portable gas container, the controller, and the plasma delivery device, wherein the apparatus is configured to be unconnected to an electric power grid during processing of materials.

2. The plasma arc torch apparatus of claim 1 wherein the plasma delivery device comprises a plasma arc torch.

3. The plasma arc torch apparatus of claim 1 further comprising electrical leads for providing the DC current from the battery to the plasma delivery device.

4. The plasma arc torch apparatus of claim 3 wherein the portable enclosure houses the electrical leads and the plasma delivery device.

5. The plasma arc torch apparatus of claim 1 further comprising a fluid conduit for providing gas from the portable gas container to the plasma delivery device.

6. The plasma arc torch apparatus of claim 5 wherein the portable enclosure houses the fluid conduit.

7. The plasma arc torch apparatus of claim 5 wherein the controller comprises a DC control valve for controlling the pressure of the gas provided to the plasma delivery device via the fluid conduit.

8. The plasma arc torch apparatus of claim 1 wherein the controller is in electrical communication with the battery to control the DC current delivered to the plasma delivery device.

9. The plasma arc torch apparatus of claim 1 wherein the controller is in communication with the portable gas container to control the gas delivered to the plasma delivery device.

10. The plasma arc torch apparatus of claim 1 wherein the portable enclosure is a briefcase-style housing.

11. An autonomous plasma arc torch apparatus for cutting a workpiece comprising:
a replaceable or rechargeable battery means;
a replaceable or rechargeable portable gas container means configured such that the plasma arc torch apparatus is capable of cutting the workpiece without a continuous gas source;
a control means in communication with the battery means and the portable gas container means;
a plasma delivery means receiving, via the control means a DC current from the battery means and gas from the portable gas container means to generate a plasma arc; and
a mobile, portable enclosure means capable of being hand-carried to a remote location, the portable enclosure means housing the battery means, the portable gas container means, the control means, and the plasma delivery means, wherein the apparatus is configured to be unconnected to an electric power arid during cutting of the workpiece.

12. The plasma arc torch apparatus of claim 11 wherein the plasma delivery means comprises a plasma arc torch.

13. The plasma arc torch apparatus of claim 11 further comprising electrical leads for providing current from the battery means to the plasma delivery means, the portable enclosure means housing the electrical leads.

14. The plasma arc torch apparatus of claim 11 further comprising a fluid conduit for providing gas from the portable gas container means to the plasma delivery means, the portable enclosure means housing the fluid conduit.

15. The plasma arc torch apparatus of claim 11 wherein the mobile, portable enclosure means is a hand-held, briefcase-style housing.

16. An autonomous portable plasma torch system for processing materials comprising:
a portable torch section comprising a plasma delivery device;
a portable torch attachment section comprising a replaceable or rechargeable battery and having a replaceable or rechargeable portable gas container configured such that the plasma torch is capable of processing materials without a continuous gas source, wherein the portable torch attachment section is attachable to the torch section; and
a mobile, portable enclosure capable of being hand-carried to a remote location, the portable enclosure housing the portable torch section and the portable torch attachment section, wherein the system is configured to be unconnected to an electric power grid during processing of materials.

17. The portable plasma torch system of claim 16 wherein the portable torch section includes a transmission medium, a controller, and the plasma delivery device.

18. An autonomous plasma arc torch apparatus for processing materials comprising:
a replaceable or rechargeable battery;
a replaceable or rechargeable, portable gas container configured such that the plasma arc torch is capable of processing materials without a continuous gas source;
a controller in communication with the battery and the portable gas container, the controller receiving DC power from the battery via a DC relay, the controller consisting essentially of a trigger, a high DC voltage solid-state relay, a DC pilot arc circuit powered by the battery, and a low-voltage solenoid valve in communication with the portable gas container and powered by a low-voltage DC source;
a plasma delivery device receiving, via the controller, a DC current from the battery and gas from the portable gas container to generate a plasma arc; and
a mobile, portable enclosure capable of being hand-carried to a remote location, the portable enclosure housing the battery and the controller, wherein the apparatus is configured to be unconnected to an electrical power grid during processing of materials.

19. The apparatus of claim 18, wherein the torch apparatus includes a pressure regulator.

20. The plasma arc torch apparatus of claim 1, wherein the plasma delivery device is removable from the mobile, portable enclosure during processing of materials.

* * * * *

UNITED STATES PATENT AND TRADEMARK OFFICE
CERTIFICATE OF CORRECTION

| | | |
|---|---|---|
| PATENT NO. | : 7,615,719 B2 | Page 1 of 1 |
| APPLICATION NO. | : 11/518858 | |
| DATED | : November 10, 2009 | |
| INVENTOR(S) | : E. Michael Shipulski | |

It is certified that error appears in the above-identified patent and that said Letters Patent is hereby corrected as shown below:

In claim 11, at column 7, line 32, delete "via the control means" and replace it with --via the control means,--

In claim 11, at column 7, line 41 delete "power arid" and replace it with --power grid--

Signed and Sealed this

Fifth Day of January, 2010

David J. Kappos
*Director of the United States Patent and Trademark Office*